(12) United States Patent
Malik et al.

(10) Patent No.: US 7,907,305 B2
(45) Date of Patent: Mar. 15, 2011

(54) ESTIMATING AN AMOUNT OF COLOR CONTENT IN A DOCUMENT

(75) Inventors: Amal Zaka Malik, Webster, NY (US); Xing Li, Webster, NY (US); Ramesh Nagarajan, Pittsford, NY (US)

(73) Assignee: Xerox Corporation, Norwalk, CT (US)

( * ) Notice: Subject to any disclaimer, the term of this patent is extended or adjusted under 35 U.S.C. 154(b) by 558 days.

(21) Appl. No.: 12/026,018

(22) Filed: Feb. 5, 2008

(65) Prior Publication Data
US 2009/0195801 A1   Aug. 6, 2009

(51) Int. Cl.
*H04N 1/50* (2006.01)
*G06K 15/00* (2006.01)
*G03F 3/10* (2006.01)
*G03G 21/02* (2006.01)

(52) U.S. Cl. ......... 358/1.9; 358/3.06; 358/2.1; 358/527; 358/540; 358/538; 358/518; 399/79; 399/81

(58) Field of Classification Search .................. 358/1.9, 358/3.06, 1.14, 1.13, 1.15, 2.1, 527, 540, 358/538, 518; 399/79, 8, 81, 24
See application file for complete search history.

(56) References Cited

U.S. PATENT DOCUMENTS

| | | | |
|---|---|---|---|
| 4,890,165 A | 12/1989 | Hasegawa | |
| 6,157,469 A | 12/2000 | Mestha | |
| 6,240,205 B1 | 5/2001 | Fan et al. | |
| 6,377,304 B1 | 4/2002 | Saitoh et al. | |
| 6,493,019 B1 | 12/2002 | Hirasawa | |
| 6,580,525 B1 | 6/2003 | Iwakiri et al. | |
| 2002/0032027 A1 | 3/2002 | Kirani et al. | |
| 2003/0140315 A1 | 7/2003 | Blumberg et al. | |
| 2005/0174591 A1 | 8/2005 | Sowinski et al. | |
| 2008/0079967 A1 | 4/2008 | He | |
| 2009/0109454 A1 * | 4/2009 | Nagarajan et al. | 358/1.9 |
| 2009/0195799 A1 | 8/2009 | Malik et al. | |
| 2009/0195800 A1 | 8/2009 | Malik et al. | |

OTHER PUBLICATIONS

Kartheek Chandu and Eli Saber and Wencheng Wu, A Mutual Information Based Automatic Registration and Analysis Algorithm for Defect Identification in Printed Documents, Image Processing 2007-ICIP 2007-IEEE International Conference, Oct. 17, 2007, Rochester Institute of Technology, Rochester, New York.
Non-Final Office Action, U.S. Appl. No. 12/025,991, Jan. 11, 2010.

* cited by examiner

*Primary Examiner* — Charlotte M Baker
(74) *Attorney, Agent, or Firm* — Philip E. Blair; Fleit Gibbons Gutman Bongini & Bianco P.L.

(57) ABSTRACT

What is provided herein is a novel system and method for estimating the amount of color in a document. In one embodiment, a binary CMYK input image is received. Each of the CMYK plane is received at an offset from the previous plane, i.e., the 4 planes are not received simultaneously. Each plane is divided into M×N tiles. Pixel values of all four planes are examined separately and the number of on-pixels is counted for each plane. The number of on-pixel counts for each tile are aggregated for each plane. Total on-pixel counts are used to estimate the total number of white, black, color, and gray pixel counts. The total counts for all planes are used to estimate the amount of color. A document is determined to be color if the amount of color exceeds a predetermined threshold. A color billing strategy is determined based on the estimated color amount.

15 Claims, 2 Drawing Sheets

ESTIMATING AN AMOUNT OF COLOR CONTENT IN A DOCUMENT

TECHNICAL FIELD

The present invention is directed to system and methods for estimating the amount of color in a document to be printed.

BACKGROUND

In dynamic print-job environments which process color print jobs for customers, billing is often based on the amount of color content contained in the job to be printed. In order to bill customers for color printing, color detection is a very important feature required in the image path. Color detection is used to analyze print documents for presence as well as amount of color in order to bill customers accordingly.

Some systems rely on user input settings for billing information. This can cause incorrect billing especially in the case of a multi-page document having color on some of the pages but not on others. In these case, the print-job operator would have to physically scan every page of the entire multi-page document in order to properly take into account all the color content contain in the document. This can be time consuming and expensive. This is especially problematic in dynamic print-job environments where print-job processing time and throughput must be maximized in order to maintain profitability.

In some instances, if a large multi-page document contains any color at all, the customer is charged for the whole document as being a color. This can be problematic for the customer if their large multi-page document really only contains very little color content and the price differential between a black/white print-job differs substantially from the price of a color print-job.

Also, billing has traditionally been only a 2-tier billing model. In other words, as long as any single color pixel (C, M, or Y) is turned on, the entire page is billed at the higher rate for reproducing a page of color content. With the need to go with multi-tier color billing, there is a need in this art to examine all 4 color planes (CMYK) quickly and efficiently.

However, all four color planes may not always be synchronized when the image path hardware examines the color content of the document because the pixels from each of the different color planes may not be looked at simultaneously. Depending on the kind, amount, and type of image content contained in a particular color page, the results can vary significantly if inefficient metrics such as the number of color pixels or percentage coverage of color is used instead.

Accordingly, what is needed in this art are increasingly sophisticated applications and advanced methodologies for color management systems which correctly estimate the amount of color content in a multi-page document when all four color planes (CMYK) are not available simultaneously.

BRIEF SUMMARY

What is provided herein is a novel system and method for estimating the amount of color in a document in print/copy job environments where the four color (CMYK) planes have an offset and therefore the information about all four planes is not available simultaneously. A color billing strategy can be implemented based on the estimated color amount.

In one embodiment, a binary CMYK input image is received. The boundaries of the binary input image are cropped to produce a smaller window inside the image to avoid false colors on the border being counted as color. Each color plane of the binary input image is divided into M×N tiles. The size of each tile is based on an optimization between detection accuracy and system resources. A size of each tile can be, for example, (s×t), where s is the number of pixels in a tile in the horizontal direction, and t is the number of scanlines in each tile. The binary image is examined to determine the number of on-pixel color counts for each tile for each color plane. Pixel values of all four planes are examined separately and the number of on-pixels is counted for each plane. The number of on-pixel counts for each tile is aggregated for each plane. Total on-pixel counts in each plane as well as counts from sub-divided tiles in each plane are used to estimate the total number of white, black, color, and gray pixel counts. The total number of pixel counts for all color planes are used to estimate the amount of color in the image. A document is determined to be color if the amount of color exceeds a predetermined threshold. A color billing strategy can then be implemented based on the estimated color amount.

The subject matter disclosed herein will next be described in connection with certain illustrated embodiments. It should be understood that various changes and modifications can be made by those skilled in the art without departing from the spirit or scope of the invention.

BRIEF DESCRIPTION OF THE DRAWINGS

The foregoing and other features and advantages of the subject matter disclosed herein will be made apparent from the following detailed description taken in conjunction with the accompanying drawings, in which.

DETAILED DESCRIPTION

What is provided is a method for estimating the amount of color in a document to be printed in print/copy job environments where the four color (CMYK) planes have an offset and therefore the information about all four planes are not available simultaneously. A color billing strategy can be implemented based on the estimated color amount.

It should be understood that one of ordinary skill in this art would be readily familiar with many facets of color science such as, but not limited to, color space, color image scaling, color transformation, and other related techniques commonly found in the color science arts. Additionally, one of ordinary skill in this art would also be familiar with advanced mathematical techniques for color manipulation and color transformation. One of ordinary skill in this art would also be knowledgeable about computer science and software and programming systems and methods sufficient to implement the functionality and capabilities described in detail herein in their own hardware environments without undue experimentation.

Figure 1:
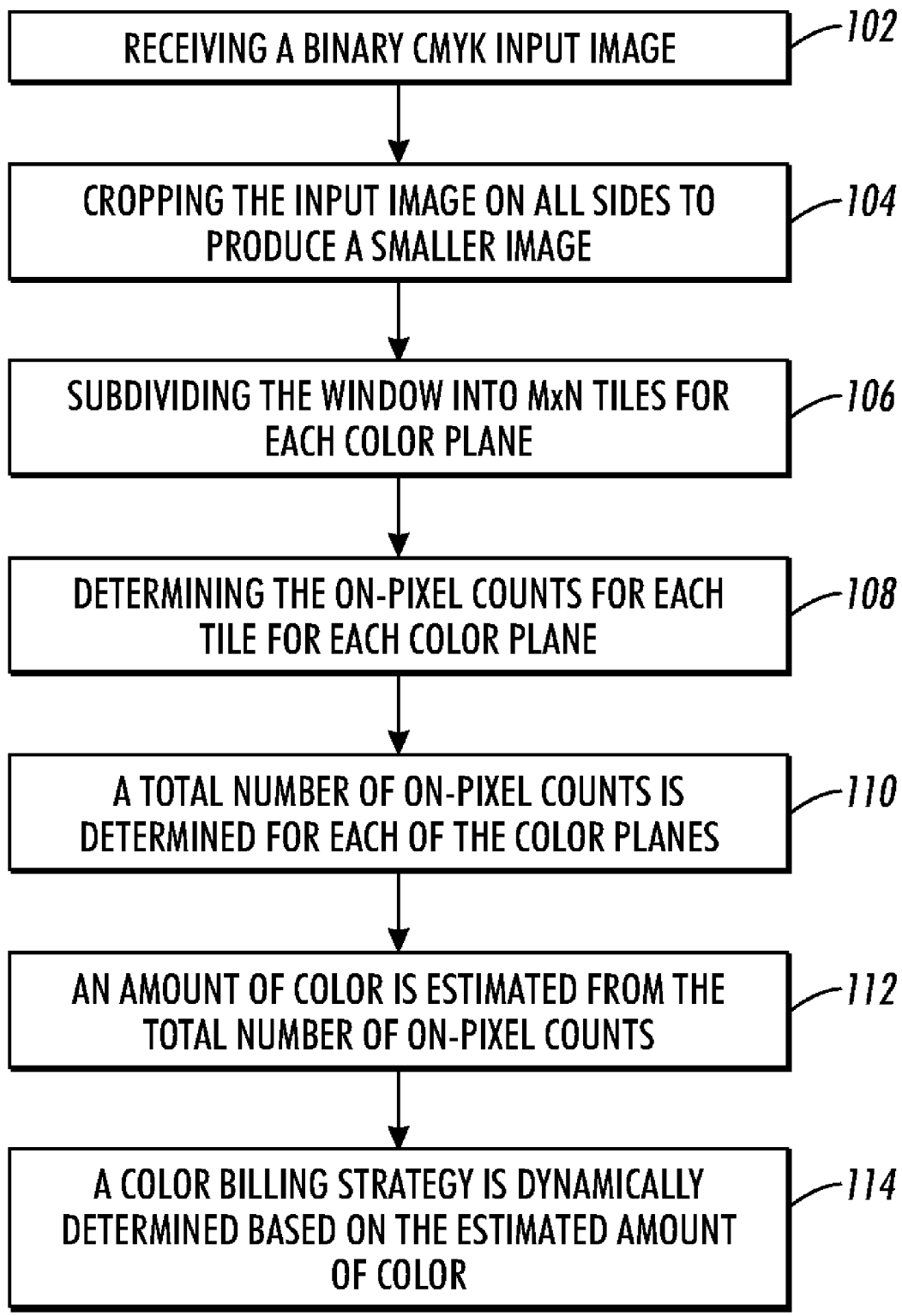
FIG. 1 illustrates a flow diagram of one embodiment of the present method for estimating the amount of color content in a document.

Reference is now being made to FIG. 1 which illustrates a flow diagram of one embodiment of the present method for estimating the amount of color in a document to be printed.

At step 102, a binary CMYK input image is received.

At step 104, a slightly smaller window inside the original image is obtained by cropping the image from all four sides to produce a slightly smaller image. This avoids false colors on the border being counted as color. Typical example would be to crop off 100 pixels from the left and right, and 100 scanlines from the top and bottom of the image to create a slightly smaller window inside the original image.

At step 106, the slightly smaller cropped window is then subdivided into M×N tiles for each color plane wherein the size of the tile is based on the optimization between detection accuracy and system resources such as memory or storage capacity. In one embodiment, tile size is given by: (s×t), where s is the number of pixels in a tile in the horizontal direction, and t is the number of scanlines in each tile.

At step 108, the on-pixel count is determined for each of the tiles for each of the color planes. In one embodiment, these values are stored for each of the CMYK colors respectively in arrays given by: C_ON[P], M_ON[P], Y_ON[P], K_ON[P], where P is the total number of tiles in each plane. It should be understood that the total number of tiles in each plane is equal to the product of M and N. The aggregated on-pixel count for the whole image is determined by an iterative loop defined by: (i=1 to P), where i is the index for each of the color arrays C_ON[ ], M_ON[ ], Y_ON[ ], K_ON[ ]. Alternatively, the iterative loop is defined by: (i=0 to P−1).

The following logic is applied for each tile in the above iterative loop.

If (K_ON[i]=(s×t)) then C_ON[i], M_ON[i], Y_ON[i] are ignored, even if they are non-zero since these add nothing to the color count.

If (K_ON[i]≠(s×t)) then if (C_ON[i]>((s×t)−K_ON[i])) then C_ON[i]=(s×t)−K_ON[i]. The same logic is applied to M_ON[i] and Y_ON[i] in order to clip the values to a maximum value of: (s×t)−K_ON[i].

If any two of C_ON[i], M_ON[i], Y_ON[i] are zero and a third is non-zero then the non-zero value is added to minsumclr and maxsumclr counts, where minsumclr and maxsumclr will be the estimated minimum and maximum color counts in the binary CMYK document being printed.

Else, if more than one planes for a current tile have non-zero entries, the maximum of C_ON[i], M_ON[i], and Y_ON[i] is set as the value of minclr. This assumes a maximum overlap of color planes. The minclr is added to minsumclr.

maxclr for the current tile becomes: C_ON[i]+M_ON[i]+Y_ON[i], assuming no overlap.

The number of black off-pixels in this tile is: kOFF=((s×t)−K_ON[i]).

If (kOFF<maxclr) then maxclr=kOFF, otherwise maxclr retains its original value=C_ON[i]+M_ON[i]+Y_ON[i]. The maxclr is added to maxsumclr.

After the image has gone through the on-pixel counting process, a total of P×4 values are produced.

At step 110, the total on-pixel count is determined for each of the Cyan, Magenta, Yellow, and Black planes by adding together all the on-pixel counts for each tile for each plane. These are summed, respectively, as: sumC_ON, sumM_ON, sumY_ON, and sumK_ON.

At step 112, a total amount of color for the input image is estimated based on the total on-pixel counts.

At step 114, a color billing strategy is dynamically determined for the document based on the estimated color amount.

In one embodiment, the color billing strategy is based on the values of minsumclr and maxsumclr, wherein the actual color count lies somewhere in between, as shown:

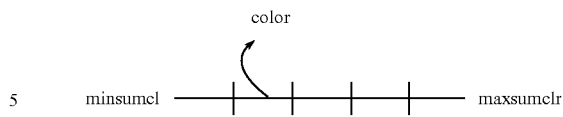

In one example, a color billing strategy involves the following determination.

Let perct_th be a value for a color threshold determination. Let pcntg_size=(perct_th/100)*total_window_size.

If (minsumclr≧pcntg_size) then the page is a color page and can be billed at a color rate.

If ((minsumclr<pcntg_size) AND (maxsumclr>pcntg_size) then the color level can be estimated as: level_delta=(maxsumclr−minsumclr)/q, where q is the number of levels to be used for color billing. Based on level_delta, minsumclr to maxsumclr can be divided into q levels where pcntg_size lies in one of these levels. The level in which pcntg_size lies can be used as a threshold for a color billing strategy.

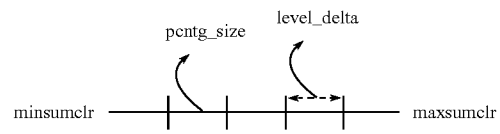

In another embodiment, a color billing strategy is based on the minimum amount of color in the image. Let min_ImageColor=max(sumC_ON, sumM_ON, sumY_ON). Let sumK_OFF=window_size−sumK_ON, where sumK_OFF is the total number of black off-pixels, and window_size is the size of the cropped image window. The threshold determination becomes:

If ((sumK_OFF>pcntg_size) AND (min_Imagecolor>pcntg_size), then the image can be billed at a color rate.

Alternatively, an average or median of minsumclr and maxsumclr could be used to determine a threshold for color billing. Various other multi-tiered billing strategies are envisioned.

As the specific implementation of the end-user hereof will vary depending on hardware and/or software constraints, program code in a particular programming language has been omitted.

It should be understood that the flow diagrams depicted herein are illustrative. Operations may be added, modified, enhanced, condensed, integrated, or consolidated. Variations thereof are envisioned and are intended to fall within the scope of the appended claims.

Figure 2:
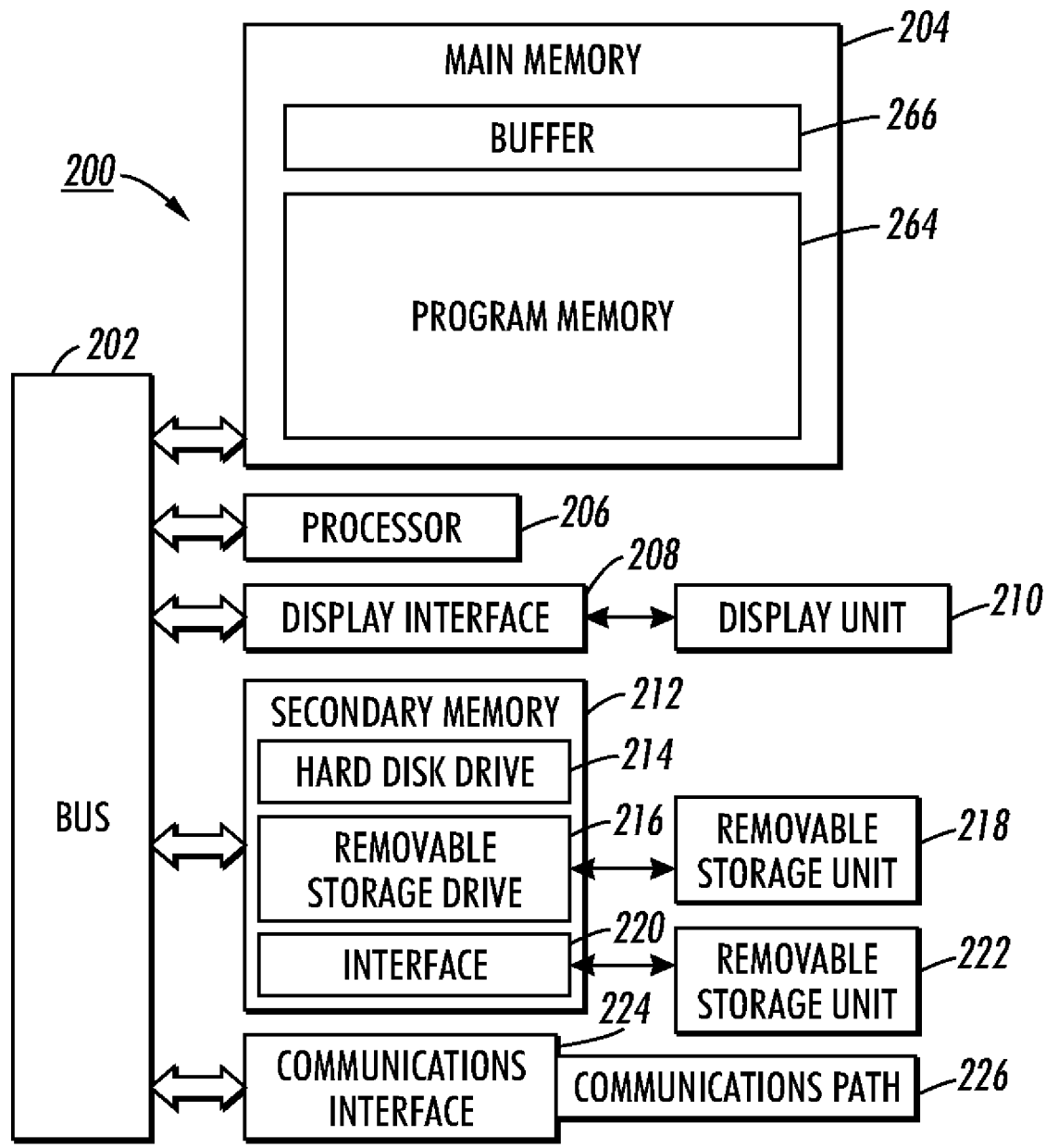
FIG. 2 illustrates a block diagram of one embodiment of a computer system useful for implementing the method illustrated in the flow diagram of FIG. 1.

Reference is now being made to FIG. 2 illustrating a block diagram of one embodiment of a computer system useful for implementing the method illustrated in the flow diagram of FIG. 1.

The computer system 200 can be a xerographic system, a photocopier, or printing device. The computer system includes one or more processors, such as processor 206 capable of executing machine executable program instructions. In the embodiment shown, the processor is in communication with bus 202 (e.g., a backplane interface bus, crossover bar, or data network). The computer system also includes a main memory 204 that is used to store machine readable instructions to be executed by the processor. The main memory is capable of storing data used by or produced by the processor. The main memory may alternatively include random access memory (RAM) to support reprogramming and flexible data storage.

In the embodiment shown, main memory includes buffer 266 to temporarily store data for access by the processor, and a program memory 264 that includes, for example, executable programs that implement the methods described herein. The program memory is capable of storing a subset of the data that is less than all of the data contained in the buffer.

Computer system 200 includes a display interface 208 that forwards data from communication bus 202 (or from a frame buffer not shown) to display 210. The computer system also includes a secondary memory 212. The secondary memory may include, for example, a hard disk drive 214 and/or a removable storage drive 216 which reads and writes to removable storage unit 218, such as a floppy disk, magnetic tape, optical disk, etc., that stores computer software and/or data.

In an alternative embodiment, the secondary memory 212 includes other similar mechanisms for allowing computer programs or other instructions to be loaded into the computer system. Such mechanisms may include, for example, a removable storage unit 222 adapted to exchange data through interface 220. Examples of such mechanisms include a program cartridge and cartridge interface (such as that found in video game devices), a removable memory chip (such as an EPROM, or PROM) and associated socket, and other removable storage units and interfaces 220 which allow software and data to be transferred from the removable storage unit to the computer system.

The computer system 200 includes a communications interface 224 which acts as both an input and an output to allow software and data to be transferred between the computer system and external devices. Examples of a communications interface include a modem, a network interface (such as an Ethernet card), a communications port, a PCMCIA slot and card, etc. Software and data transferred via the communications interface are in the form of signals which may be, for example, electronic, electromagnetic, optical, or other signals capable of being received by communications interface 224. These signals are provided to communications interface via a communications path 226 (i.e., channel) which carries signals and may be implemented using wire, cable, fiber optic, phone line, cellular link, RF, or other communications channels.

Terms such as, computer program medium, computer executable medium, computer usable medium, and computer readable medium, are used herein to generally refer to media such as main memory 204 and secondary memory 212, removable storage drive 216, a hard disk installed in hard disk drive 214, and signals. These computer program products are means for providing instructions and/or data to the computer system. The computer readable medium stores data, instructions, messages packets, or other machine readable information. The computer readable medium, for example, may include non-volatile memory, such as a floppy, ROM, flash memory, disk memory, CD-ROM, and other permanent storage useful, for example, for transporting information, such as data and computer instructions. Furthermore, the computer readable medium may comprise computer readable information in a transitory state medium such as a network link and/or a network interface, including a wired network or a wireless network, which allows a computer to read such computer readable information. Computer programs (also called computer control logic) may be stored in main memory and/or secondary memory. Computer programs may also be received via a communications interface. Such computer programs, when executed, enable the computer system to perform the features and capabilities provided herein.

It should be understood that the method described in the flowcharts provided herewith can be implemented on a special purpose computer, a micro-processor or micro-controller, an ASIC or other integrated circuit, a DSP, an electronic circuit such as a discrete element circuit, a programmable device such as a PLD, PLA, FPGA, PAL, PDA, and the like. In general, any device capable of implementing a finite state machine that is in turn capable of implementing one or more elements of the flow diagrams provided herewith, or portions thereof, can be used. Portions of the flow diagrams may also be implemented partially or fully in hardware in conjunction with machine executable instructions.

Furthermore, the flow diagrams hereof may be partially or fully implemented in software using object or object-oriented software development environments that provide portable source code that can be used on a variety of computer, workstation, server, network, or other hardware platforms. One or more of the capabilities hereof can be emulated in a virtual environment as provided by an operating system, specialized programs, or from a server.

It should also be understood that the teachings hereof can be implemented in hardware or software using any known or later developed systems, structures, devices, and/or software by those skilled in the applicable art without undue experimentation from the functional description provided herein with a general knowledge of the relevant arts. Moreover, the methods hereof may be readily implemented as software executed on a programmed general purpose computer, a special purpose computer, a microprocessor, or the like. In this case, the methods hereof can be implemented as a routine embedded on a personal computer or as a resource residing on a server or workstation, such as a routine embedded in a plug-in, a printer, a photocopier, a driver, a scanner, a photographic system, a xerographic device, or the like. The methods provided herein can also be implemented by physical incorporation into an image processing, image reproduction, or color management system.

One or more aspects of the methods described herein are intended to be incorporated in an article of manufacture, including one or more computer program products, having computer usable or machine readable media. For purposes hereof, a computer usable or machine readable media is, for example, a floppy disk, a hard-drive, memory, CD-ROM, DVD, tape, cassette, or other digital or analog media, or the like, which is capable of having embodied thereon a computer readable program, one or more logical instructions, or other machine executable codes or commands that implement and facilitate the function, capability, and methodologies described herein. Furthermore, the article of manufacture may be included on at least one storage device readable by a machine architecture or other xerographic or image processing system embodying executable program instructions capable of performing the methodology described herein. Additionally, the article of manufacture may be included as part of a xerographic system, an operating system, a plug-in, or may be shipped, sold, leased, or otherwise provided separately either alone or as part of an add-on, update, upgrade, or product suite.

It will be appreciated that the above-disclosed and other features and functions, or alternatives thereof, may be desirably combined into many other different systems or applications. Various presently unforeseen or unanticipated alternatives, modifications, variations, or improvements therein may become apparent and/or subsequently made by those skilled in the art which are also intended to be encompassed by the following claims. Accordingly, the embodiments set forth above are considered to be illustrative and not limiting. Various changes to the above-described embodiments may be made without departing from the spirit and scope of the invention.

What is claimed is:

1. A method for determining a billing strategy for a document based upon an estimated an amount of color in that document, the method comprising:
   - receiving a binary input color image of a document for which a billing strategy is to be determined, wherein each color plane of said binary color image is received at an offset of other color planes;
   - dividing each color plane of said binary input image into M×N tiles;
   - examining said binary input image to determine an on-pixel count for each of said tiles;
   - aggregating said on-pixel counts for each tile to obtain a total on-pixel count for each of said color planes;
   - estimating an amount of color in said binary input image based on said total on-pixel counts for each color plane; and
   - determining a billing strategy for said document based upon said estimated color amount.

2. The method of claim 1, further comprising cropping boundaries of said binary input image to produce a smaller window inside said image.

3. The method of claim 1, wherein a size of each tile is based on an optimization between detection accuracy and system resources.

4. The method of claim 1, further comprising dynamically determining a color billing strategy based on a total number of black off-pixels in said image.

5. The method of claim 1, further comprising dynamically determining a color billing strategy for said document based on said estimated amount of color exceeding a predetermined color threshold value.

6. A system for determining a billing strategy for a document based upon an estimated an amount of color in that document, the system comprising:
   - a storage medium capable of storing data; and
   - a processor in communication with said storage medium, said processor capable of executing a machine readable instruction for performing the method of:
     - receiving a binary input color image of a document for which a billing strategy is to be determined, wherein each color plane of said binary color image is received at an offset of other color planes;
     - dividing each color plane of said binary input image into M×N tiles;
     - examining said binary input image to determine an on-pixel count for each of said tiles;
     - aggregating said on-pixel counts for each tile to obtain a total on-pixel count for each of said color planes;
     - estimating an amount of color in said received binary input image, said estimation being based on said total on-pixel counts for each color plane; and
     - determining a billing strategy for said document based upon said estimated color amount.

7. The system of claim 6, further comprising dynamically determining a color billing strategy for said document based on said estimated amount of color exceeding a predetermined color threshold value.

8. The system of claim 6, further comprising dynamically determining a color billing strategy based on a total number of black off-pixels in said image.

9. The system of claim 6, further comprising cropping boundaries of said binary input image to produce a smaller window inside said image.

10. The system of claim 6, wherein a size of each tile is based on an optimization between detection accuracy and system resources.

11. A computer program product for determining a billing strategy for a document based upon an estimated an amount of color in that document, the computer program product comprising:
    - a non-transitory computer readable medium for storing instructions that, when executed on a computer, cause the computer to perform a method comprising:
      - receiving a binary input color image of a document for which a billing strategy is to be determined, wherein each color plane of said binary color image is received at an offset of other color planes;
      - dividing each color plane of said binary input image into M×N tiles;
      - examining said binary input image to determine an on-pixel count for each of said tiles;
      - aggregating said on-pixel counts for each tile to obtain a total on-pixel count for each of said color planes;
      - estimating an amount of color in said received binary input image, said estimation being based on said total on-pixel counts for each color plane; and
      - determining a billing strategy for said document based upon said estimated color amount.

12. The computer program product of claim 11, further comprising cropping boundaries of said binary input image to produce a smaller window inside said image.

13. The computer program product of claim 11, wherein a size of each tile is based on an optimization between detection accuracy and system resources.

14. The computer program product of claim 11, further comprising dynamically determining a color billing strategy for said document based on said estimated amount of color exceeding a predetermined color threshold value.

15. The computer program product of claim 11, further comprising dynamically determining a color billing strategy based on a total number of black off-pixels in said image.

* * * * *